United States Patent [19]

Kitahara et al.

[11] Patent Number: 5,043,396

[45] Date of Patent: Aug. 27, 1991

[54] CROSSLINKED POLYMER HAVING SHAPE MEMORIZING PROPERTY, METHOD OF ITS USE, AND MOLDED ARTICLE HAVING SHAPE MEMORY

[75] Inventors: Shizuo Kitahara, Kawaguchi; Nobuo Nagata, Yokohama, both of Japan

[73] Assignee: Nippon Zeon Co., Ltd., Tokyo, Japan

[21] Appl. No.: 458,422

[22] Filed: Dec. 28, 1989

[30] Foreign Application Priority Data

Dec. 28, 1989 [JP] Japan ................................. 63-332303

[51] Int. Cl.$^5$ ................................................ C08F 8/18
[52] U.S. Cl. ............................. 525/332.9; 525/359.5; 525/369; 525/370; 525/373; 525/377; 525/332.5; 525/332.7
[58] Field of Search ..................... 525/359.5, 369, 370, 525/373, 377, 332.9

[56] References Cited

U.S. PATENT DOCUMENTS 4,330,597 5/1982 Heins et al. ......................... 525/373

Primary Examiner—Bernard Lipman
Attorney, Agent, or Firm—Sherman and Shalloway

[57] ABSTRACT

A crosslinked polymer having shape memorizing property, said crosslinked polymer being obtained by thermally reversibly crosslinking a base polymer composed of a blocked copolymer of an aromatic vinyl monomer and a conjugated diene monomer, the base polymer having a glass transition temperature of 70° to 140° C., and the glass transition temperature being higher than the dissociation temperature of the thermally reversible crosslinkage contained in the crosslinkage polymer.

14 Claims, No Drawings

CROSSLINKED POLYMER HAVING SHAPE MEMORIZING PROPERTY, METHOD OF ITS USE, AND MOLDED ARTICLE HAVING SHAPE MEMORY

This invention relates to a crosslinked polymer having shape memorizing property, and more specifically, to a crosslinked polymer having shape memorizing property which has excellent moldabilty and shape recovery properties and can be repeatedly deformed.

This invention also relates to a method of using the crosslinked polymer and a molded article having shape memory which is prepared from the crosslinked polymer.

A shape-memory article is an article which where its handling in its original shape is difficult in various operations such as mounting, assembling or transportation, can be rendered easily handleable by imparting deformation, and can recover its original shape after such an operation is terminated. It has utility in various industrial applications. This shape-memory article can also be used for the purpose of recovering the original shape of a deformed article, for example as a toy.

Examples of such a shape-memory article having shape recovering properties include a molded article of a norbornene-type polymer (U.S. Pat. No. 4,831,094), a molded article of polycaprolactone crosslinked with at least 3 functional groups such as allyl groups, acrylic acid groups or methacrylic aicd groups per molecule (Japanese Laid-Open Publicartion No. 11315/1984), a molded article of a crystalline diene polymer crosslinked with sulfur, a sulfur donor organic compound, or an organic peroxide (Japanese Laid-Open Patent Publication No. 192440/1987), and a three-dimensional network structure composed of a vinyl polymer and an acrylic acid derivative polymer (Japanese Laid-Open Patent Publication No. 174263/1987). These conventional shape-memory molded articles have not proved to be entirely satisfactory in practical application in regard to moldability, temperatures at which the original shape is recovered, or the recyclical use of articles.

The present inventors have now found that the use of a crosslinked product of a specific block copolymer gives a molded article having excellent moldability and shape recovery which can be repeatedly deformed.

Thus, there is provided in accordance with this invention a crosslinked polymer having shape memorizing property, said crosslinked polymer being obtained by thermally reversibly crosslinking a base polymer composed of a blocked copolymer of an aromatic vinyl monomer and a conjugated diene monomer, the base polymer having a glass transition temperature of 70° to 140° C., and being higher than the dissociation temperature of the thermally reversible crosslinkage contained in the crosslinked polymer.

In the present invention, the glass transition temperature of a polymer denotes the glass transition temperature of the aromatic vinyl polymer portion of the polymer, so far as the polymer is a base polymer, a dissociated polymer or a modified base polymer.

According to this invention, there is also provided a method of using a crosslinked polymer having shape memorizing property, which comprises molding said crosslinked polymer at the glass transition temperature of the basepolymer or a higher temperature to form a molded article having a memory of its shape imparted by the molding, imparting a deformation to the molded article at a temperature below the glass transition temperature, cooling the deformed article to the dissociation temperature of the thermally reversible crosslinkage of the crosslinked polymer or a lower temperature to set the deformation, and heating the deformed article to a temperature below the glass transition temperature of the base polymer but above the dissociation temperature thereby to release the set deformation and recover the shape memorized during the molding.

According to this invention, there is further provided a molded article having a memory of its shape imparted by molding, said molded article being obtained by molding the above crosslinked polymer having shape memorizing property at the glass transition temperature of the base polymer or a higher temperature.

The base polymer used for the synthesis of the crosslinked polymer having shape memorizing property is a block copolymer of an aromatic vinyl monomer and a conjugated diene monomer. The aromatic vinyl monomer may be any aromatic vinyl monomer which can be block-copolymerized with the conjugated diene monomer. Specific examples of the aromatic vinyl monomer are styrene, alphamethylstyrene, 2-methylstyrene, 4-methylstyrene, 2,4-dimethylstyrene, 2,6-dimethylstyrene, vinylnaphthalene and isopropenylnaphthalene. Examples of the conjugated diene monomer include butadiene, isoprene, piperylene, phenylbutadiene, 1,4-diphenylbutadiene and 2,3-dimethylbutadiene. The aromatic vinyl monomer or the conjugated diene monomer may each be used singly or in combination with each other. The block copolymer synthesized from these monomers may be a diblock copolymer or a tri-block or a multiblock copolymer. It may also be a linear block copolymer, or a branched or radial block copolymer which is obtained in the presence or absence of various coupling agents. Alternatively, the blocked copolymer may be partially hydrogenated.

There is no particular limitation to the molecular weight of the block copolymer. Usually, it has a molecular weight of 30,000 to 800,000, preferably 50,000 to 500,000, and the aromatic vinyl polymer moiety has a molecular weight of 3,000 to 300,000, preferably 5,000 to 200,000. There is neither any particular limitation on the ratio between the aromatic vinyl polymer portion and the conjugated diene polymer portion in the block copolymer.

In the present invention, the block copolymer has a glass transition temperature of 70° to 140° C. When ionically crosslinkable groups are used as an atomic grouping capable of being crosslinked thermally reversibly, its glass transition temperature is preferably at least 80° C. in view of its relation to the dissociation temperature of the resulting thermally reversible crosslinkage.

The crosslinked polymer having shape memorizing property in accordance with this invention is a thermally reversibly crosslinked polymer obtained by crosslinking the base polymer with atomic groupings capable of thermally reversible crosslinking. In the present invention, the thermally reversible crosslinkage denotes a crosslinkage that can be bonded and dissociated thermally reversibly.

The atomic grouping capable of thermally reversible crosslinking denotes an atomic grouping which can form a thermally reversible crosslinkage by reaction with another atomic grouping contained in the base polymer, in a base polymer having introduced thereinto a thermally reversibly crosslinking atomic grouping (a modified base polymer), or in another compound which may be used together as a crosslinking agent. The atomic grouping herein includes an atom, a group and a molecule which may be electrical neutral, or ionic.

The thermally reversibly crosslinking atomic grouping may be included in the modified base polymer, or the compound jointly used as a croslinking agent. Conventional known methods may be applied to the synthesis of the modified base polymer.

The thermally reversible crosslinking may take place between the same kinds of atomic groupings or between dissimilar atomic groupings, or may also take place using another compound such as a metal salt as a crosslinking agent.

Specifically, this crosslinking may be effected, for example, by crosslinking the base polymer with a crosslinking agent having a thermally reversibly crosslinkable atomic grouping; crosslinking the base polymer and the modified base polymer with a thermally reversibly crosslinkable atomic grouping in the modified base polymer with or without a crosslinking agent having a thermally reversibly crosslinkable atomic grouping; or crosslinking the modified base polymer with a thermally reversibly crosslinkable atomic grouping in the modified base polymer with or without a croslilnking agent having a thermally reversibly crosslinkable atomic grouping.

The thermally reversible crosslinking reaction of the base polymer or the modified base polymer easily proceeds by uniformly mixing the reactants in the presence, as required, of the above crosslinking agent. This reaction is carried out mainly in solution or in the solid phase, but is not limited to this mode.

The crosslinked polymer having shape memorizing property of this invention can be dissociated by heating it to the dissociation temperature of a thermally reversible crosslinkage contained in the crosslinked polymer or at a higher temperature. The polymer formed at this time is termed a dissociated polymer in the present specification. As can be seen from the course of its formation, the dissociated polymer has the same structure as the base polymer or the modified base polymer. The glass transition temperature of the modified base polymer is substantially the same as that of the base polymer because the thermally reversible crosslinkage is introduced into the conjugated diene polymer moiety of the base polymer and its amount is small. Hence, the glass transition temperature of the modified base polymer and that of the dissociated polymer are almost the same as that of the base polymer, which is in the range of 70° to 140° C.

In this invention, the dissociation temperature must be lower than the glass transition temperature of the base polymer. For practical purposes it is at least 10° C. lower than the glass transition temperature of the base polymer.

The type and amount of the thermally reversibly crosslinkable atomic grouping used in this invention is selected such that the glass transition temperature of the base polymer and the dissociation temperature of the thermally reversible crosslinkage contained in the crosslinked polymer meet the above-mentioned relation. The amount of the thermally reversibly crosslinkable atomic grouping is usually not more than 10% by weight, preferably not more than 5% by weight, based on the weight of the base polymer. Its optimum amount may be properly determined experimentally according to the types and proportions of the monomers constituting the base polymer, the molecular weight of the base polymer, the type of the thermally reversibly crosslinkable atomic grouping, the type and amount of the crosslinking agent that may be used jointly, and the desired shape recovering properties. The crosslinked polymer having shape memorizing properties provided by this invention should contain at least two thermally reversible crosslinkages per base polymer molecule. However, so long as the purpose of this invention is not impaired, it may contain a base polymer containing only one thermally reversible crosslinkage.

Specific examples of the thermally reversibly crosslinkable atomic grouping that can be used in this invention are shown below without any intention of limiting the invention thereto.

A first example of the thermally reversibly crosslinkable atomic grouping is an ionically crosslinkable group. The ionically crosslinkable group is used together with a crosslinking agent to form an ionic linkage between them. The dissociation temperature of the resulting thermally reversible crosslinkage is generally 70° to 100° C.

A typical example of the ionically crosslinkable group is a carboxyl group. The carboxyl group can be easily introduced into a carbon-carbon double bond by known reactions, for example by the addition of maleic anhydride or thioglycolic acid in the presence of a radical, or by the reaction of hydroxamylchloride acid (for example),

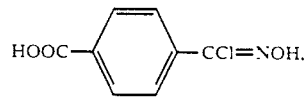

or HOOC(CH$_2$)$_n$CCl=NOH).

A crosslinking agent to be combined with the carboxyl group may be any compound which can form an ionic linkage with the carboxyl group. Generally, polyvalent metal oxides and fatty acid metal salts are used.

Ethyl thioglycolate may be cited as a similar ionically crosslinkable group forming an ionic linkage. This group has a structure of the formula —SCH$_2$COOC$_2$H$_5$ obtained by adding ethyl mercaptoacetate to a carbon-carbon double bond by using a peroxide. Addition of calcium hydroxide as a crosslinking agent to it induces the hydrolysis of the ester group to form the carboxyl group and an ionic linkage simultaneously.

An ionic linkage may be similarly formed by using a sulfonic acid group instead of the carboxyl group.

A third specific example of the ionically crosslinkable group is a tertiary amino group. The reaction of a maleic anhydride monoalkylamide or a nitrosodialkylaniline is known as a method of introducing the tertiary amino group into a carbon-carbon double bond. Dihalogen compounds such as/1,10-dichlorodecane, 1,12-dichlorododecane, 1,16-dichlorohexadecane and 1,18-dichlorooctadecane may generally be used as a crosslinking agent to be combined with the tertiary amino group.

A second example of the thermally reversible crosslinkable atomic grouping is an atomic group having conjugated diene structure. This atomic grouping can perform a reversible reaction of addition and dissociation by Diels Alder reaction and reverse Diels Alder reaction between carbon-carbon double bonds. The dissociation temperature of the thermally reversible crosslinkage formed by this atomic grouping is generally 120° to 160° C. Specific examples of compounds having at least two such atomic groupings include biscyclopentadienyl compounds such as biscyclopentadienyl pentane, 2-vinylbutadiene and dicyclopentadiene. When compounds having at least two conjugated diene structures are to be used as a crosslinking agent, they are advantageously those having a high boiling point, preferably at least 200° C. because they volatilize little at the molding temperature employed in this invention.

A third example of the thermally reversibly crosslinkable atomic grouping is nitrosyl chloride. This compound readily adds to a carbon-carbon double bond, and forms a thermally reversible crosslinkage which performs a reversible reaction of bonding and scission as shown by the following reaction.

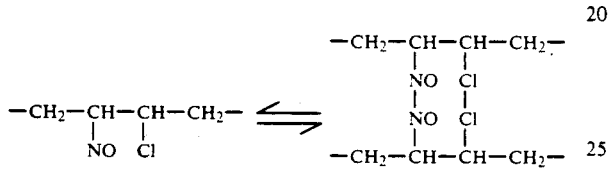

The dissociation temperature of this thermally reversible crosslinkage is generally 70° to 160° C.

A fourth example of the thermally reversibly crosslinkable atomic grouping is dinitrogen trioxide. The use of this compound can effect introduction of a nitroso group, and thus formation of a thermally reversible crosslinkage.

The molded article having shape memory can be obtained in accordance with this invention by kneading crosslinked polymer having shape memorizing property of the invention using, for example, an open roll, a Banbury mixer or a kneader and molding it at the dissociation temperature of its thermally reversible crosslinkage or a higher temperature by extrusion, injection molding, press-forming, etc. The shape of the molded article is not particularly limited.

In the production of the shape-memory molded article, it is possible to add another rubber (natural rubber or a synthetic rubber such as cis-1,4-polyisoprene rubber, polybutadiene rubber, ethylene/propylene copolymer rubber or butyl rubber) so long as it does not impair the advantage of the present invention. Furthermore, as required it is possible to add other additives including, for example, fillers, rubber reinforcing agents, rubber softening agents, plasticizers, antioxidants, antiozonants, ultraviolet absorbers, pigments, dyes and tackifier resins.

The method of using the crosslinked polymer having shape memorizing property of the invention is in accordance with the following procedures (1) to (4).

(1) The crosslinked polymer having shape memorizing property is molded at the glass transition temperature of the base polymer or at a higher temperature to form a molded article having a memory of the shape imparted by the molding. The method of molding is not particularly limited, and any of known shaping methods may be employed.

(2) The resulting molded article having shape memory then is deformed into a desired shape by any desired method at a temperature below the above glass transition temperature. The deformation temperature is preferably at least 10° C. higher than the dissociation temperature of the thermally reversible crosslinkage. It may be deformed at lower temperatures. The method of deformation is not limited. According to the shape or thickness, the molded article may be placed in an atmosphere kept at a temperature at which the molded article can be easily deformed (for example, in heated air, a heated liquid, or in steam), and then deformed by a suitable tool or device or by hand.

(3) The deformed molded article, while maintaining its shape, is cooled to the dissociation temperature or a lower temperature to set the deformation. When the deformation temperature is the above dissociation temperature or lower, setting of the deformation is effected simultaneously with the deformation. Hence, the setting operation does not have to be carried out separately. The setting of the deformation may be carried out by putting the deformed article in a medium such as cold water, a cold solvent, or cold air, although it is not limited to the use of these media.

(4) The molded article having the deformation set therein is heated to a temperature exceeding the dissociation temperature but below the glass transition temperature (the shape recovering temperature) to release the setting of the deformation and recover the shape memorized at the time of the molding. The higher the shape recovering temperature, the more rapid is the recovery of the shape. But at the glass transition temperature or above, the memory of the shape will be lost partly or wholly. The heating means is not particularly limited, and various methods may be used as in the case of molding.

Since the shape recovering temperature or the molded article of the invention having a memory of the shape imparted by the molding is not higher than the glass transition temperature of the base polymer and this shape recovering temperature ranges to a lower temperature region, this molded article can recover the memorized shape easily.

The shape-memory molded article can be used repeatedly. Specifically, after the article memorizes the shape imparted by molding, heating it again to the glass transition temperature of the base polymer or a higher temperature causes disappearance of the shape memory imparted. By imparting shape memory anew to the polymer in this state, a molded article with a new shape which can be used in a new application can be obtained.

As stated above, the present invention can give a crosslinked polymer having shape memorizing property which can be repeatedly molded with good moldability and has a relatively low shape recovering temperature.

After imparting shape memory, the crosslinked polymer of this invention having shape recovering properties can be deformed in any desired shape, cooled to set the deformation, and heated as required to recover the original shape.

The crosslinked polymer having shape memorizing property of this invention can be molded into articles of various forms having a memory of the desired shapes by various shaping methods. Where these articles are difficult to handle in these shapes in such operations as mounting, assembling or transportation, their shape is changed for easy handling, and after the end of such operations, it is possible to recover their original shape and make the articles perform their intended function.

The shape-memory molded articles of the invention which take advantage of these properties have utility, for example, as joint materials for seal materials for joining portions of pipes and electrical wires and cables, laminating materials for the inside and outside parts of pipes or rod-like objects, splint materials, various fixing materials, and shock absorbing materials.

The shape-memory articles of the invention can also be used in applications where the main purpose is to restore a deformed article to the original state. Examples of such utility are toy parts, teaching materials and decorative articles. In these applications, complete shape recovery is not always necessary. By utilizing the properties of the molded article whose shape is to be recovered, an article may be held by the molded article, or a space inside the article may be sealed up by the shape-memory article.

The following examples illustrate the present invention more specifically. All parts and percentages in these examples are by weight unless otherwise specified.

The molecular weights of polymers indicated in these examples are weight average molecular weights determined by high-performance liquid chromatography using tetrahydrofuran as a carrier.

The dissociation temperature of the thermally reversible crosslinkage was measured by using a thermal stress strain measuring device (TWA-SS100 supplied by Seiko Electronics Co., Ltd.).

The glass transition temperature was measured by a differential scanning calorimeter (DSC).

The hydrogenation ratio of carbon-carbon double bonds was measured by the iodine number method.

The block copolymers used in the following examples were obtained in a customary manner by polymerizing half of the amount of an aromatic vinyl monomer in a hydrocarbon solvent in the presence of an organic lithium-type polymerization initiator, then charging the entire amount of a conjugated diene monomer and continuing the polymerization, adding the remaining amount of the aromatic vinyl monomer, and completing the polymerization.

EXAMPLE 1

Maleic anhydride was added to a styrene/butadiene/styrene block copolymer (styrene content 82%, molecular weight 250,000; glass transition temperature 98° C.) by the method described in British Patent No. 1,332,050 to obtain a copolymer containing 0.45 g of carboxyl groups per 100 g of the copolymer. One hundred parts of this copolymer and 3 parts of zinc oxide were kneaded on a 6-inch roll to prepare a thermally reversibly crosslinked polymer in sheet form. The dissociation temperature of the thermally reversible crosslinkage was 85° C. The sheet was charged into a mold, maintained at a molding temperature of 120° C. and a molding pressure of 60 kg/cm$^2$ for 10 minutes, and then cooled to room temperature to produce a cylindrical article having a diameter of 5 mm and a length of 20 mm. In hot water at 90° C., both ends of the molded article were held by pincers and elongated so that its length became about 30 mm. When the temperature was returned to room temperature in this state, the elongated state was set. When the elongated article was again immersed in hot water at 90° C., the original shape was recovered. The recovery ratio was calculated by [(the length after shape recovery—the length at the time of deformation and setting)/(the length before deformation—the length at the time of deformation and setting)]×100, and was found to be 94%.

EXAMPLE 2

Alpha-methylstyrene-isoprene/alpha-methylstyrene block copolymer (the amount of alpha-methylstyrene 69%; molecular weight 150,000; glass transition temperature 110° C.) and hydroxamyl chloride containing a sulfonic acid group

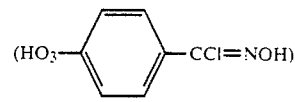

were reacted in accordance with the method of Japanese Patent Publication No. 25712/1972 to introduce 0.81 g of the sulfonic acid group per 100 g of the copolymer into the copolymer via an isoxazoline ring. One hundred parts of the modified base polymer and 5 parts of zinc oxide were kneaded on a 6-inch roll to obtain a thermally reversibly crosslinked polymer in sheet form. The dissociation of the thermally reversible crosslinkage was 95° C. The sheet was charged into a mold, maintained at a molding temperature of 130° C. and a molding pressure of 100 kg/cm$^2$ for 15 minutes, and cooled to room temperature to obtain a sheet-like molded article having a thickness of 0.3 mm, a width of 30 mm and a length of 150 mm. The molded article was wound up on an iron core having a diameter of 5 mm in hot water at 100° C., and cooled to room temperature in this state. A roll-like product was obtained. When the roll-like product was again placed in hot water at 100° C., it completely resorted to the original sheet form.

EXAMPLE 3

In accordance with the method of G. T. Knight et al. Tetrahedron, 27, 6201 (197;), styrene/isoprene/styrene block copolymer (the amount of styrene 66%; molecular weight 15,000; glass transition temperature 88° C.) was reacted with nitrodimethylaniline to give a copolymer having 0.03 dimethylamino group per carbon-carbon double bond. One hundred parts of the copolymer and 5 parts of cyclododecane were kneaded on a 6-inch roll to prepare a thermally reversibly crosslinked polymer in sheet form. The dissociation temperature of the thermally reversible crosslinkage was 75° C. The sheet was charged into a mold, maintained at a molding temperature of 120° C. and a molding pressure of 60 kg/cm$^2$ for 10 minutes, and then cooled to room temperature to give an O-ring having an inside diameter of 30 mm and a sectional diameter of 2 mm. The O-ring was twisted in an 8-figured shape in hot air at 80° C., and in this state immersed in water at 25° C. When the twisted O-ring was again placed in hot air at 80° C., it completely restored its original shape.

EXAMPLE 4

The sheet obtained in Example 2, after shape recovery, was charged into a mole, maintained at a molding temperature of 130° C. and a molding pressure of 100 kg/cm$^2$ for 15 minutes, and cooled to room temperature to obtain a cylindrical molded article having a diameter of 5 mm and a length of 20 mm. Both ends of the molded article were held by pincers and elongated in hot water at 100° C. and elongated so that its length became about 30 mm. When it was cooled in this state to room temperature, its elongated shape was set. When the elongated article was immersed in hot water at 100° C., it recovered its original shape. The recovery ratio, determined as in Example 1, was 95%.

The results given in the foregoing examples show that the crosslinked polymers having shape memorizing property of this invention and molded articles obtained from it have excellent moldabilty and shape recovering properties and a high shape recovery temperatures, and that shape memory can be imparted repeatedly to them.

We claim:

1. A crosslinked polymer having shape memorizing property, said crosslinked polymer being obtained by thermally reversibly crosslinking a base polymer composed of a block copolymer of an aromatic vinyl monomer and a conjugated diene monomer, said crosslinked polymer containing at least two thermally reversible crosslinkages per base polymer molecule, said cross linkage being introduced into a carbon-carbon double bond in the conjugated diene polymer portion of the base polymer, said block copolymer having a molecular weight of 30,000 to 800,000, the aromatic vinyl polymer moiety having a molecular weight of 3,000 to 300,000, and the aromatic vinyl polymer portion of the base polymer having a glass transition temperature of 70° and 140° C., and the glass transition temperature being higher than the dissociation temperature of the thermally reversible crosslinkage contained in the crosslinked polymer, and said dissociation temperature being at least 10° C. lower than the glass transition temperature of the base polymer.

2. The crosslinked polymer of claim 1 in which the thermally reversible crosslinkage is formed between an ionically crosslinkable group introduced into a carbon-carbon double bond in the conjugated diene polymer portion of the base polymer with a crosslinking agent.

3. The crosslinked polymer of claim 2 in which the ionically crosslinkable group is a carboxyl group which can be introduced into a carbon-carbon double bond by the addition of maleic anhydride or thioglycolic acid in the presence of a radical, or by the reaction of hydroxyamylchloride acid, or a sulfonic acid group, and the crosslinking agent is a polyvalent metal oxide or a fatty acid metal salt.

4. The crosslinked polymer of claim 2 in which the ionically crosslinkage group is a tertiary amino group which is introduced into a carbon-carbon double bond by the addition of maleic anhydride monoalkylamide or a nitrosodialkylaniline, and the crosslinking agent is a dihalogen compound selected from the group consisting of 1,1-dichlorodecane, 1,12-dichlorododecane, 1,16-dichlorohexadecane and 1,18-dichlorooctadecane.

5. The crosslinked polymer of claim 2 in which the ionically crosslinkable group is an ethyl thioglycolate group having a structure of the formula —$SCH_2COOC_2H_5$ obtained by adding ethyl mercaptoacetate to a carbon-carbon double bond, and the crosslinking agent is calcium hydroxide.

6. The crosslinked polymer of claim 1 in which the thermally reversible crosslinkage is formed by the reaction of a compound having a conjugated diene structure which can perform a reversible reaction of addition and dissociation by Diels Alder reaction and reverse Diels Alder reaction, with the carbon-carbon double bonds in the base polymer.

7. The crosslinked polymer of claim 1 in which the thermally reversible crosslinkage is formed by the crosslinkable atomic grouping which is added by the reaction of nitrosyl chloride with the base polymer.

8. The crosslinked polymer of claim 1 in which the thermally reversible crosslinkage is formed by a nitroso group which is introduced into a carbon-carbon double bond by the reaction of dinitrogen trioxide with the base polymer.

9. The crosslinked polymer of claim 1 wherein the block copolymer comprises a block of at least one aromatic vinyl monomer selected from the group consisting of styrene, alpha-methylstyrene, 2-methylstyrene, 4-methylstyrene, 2,4-dimethyl-styrene, 2,6, dimethylstyrene, vinylnaphthalene and isopropenyl-naphthalene, and a block of at least one conjugated diene monomer selected from the group consisting of butadiene, isoprene, piperylene, phenylbutadiene, 1,4-diphenylbutadiene and 2,3-dimethylbutadiene.

10. The crosslinked polymer of claim 1 wherein the amount of the thermally crosslinkable atomic grouping is 10% by weight or less, based on the weight of the base polymer.

11. The crosslinked polymer of claim 1 wherein the amount of the thermally crosslinkable atomic grouping is 5% by weight or less, based on the weight of the base polymer.

12. The crosslinked polymer of claim 1 wherein the block copolymer has a molecular weight of from about 50,000 to 500,000 and the aromatic vinyl polymer moiety has a molecular weight of from about 5,000 to 200,000.

13. The crosslinked polymer of claim 2 wherein the block copolymer has a glass transition temperature of at least 80° C.

14. A molded article having a memory of the shape imparted by the molding, and which is obtained by molding the crosslinked polymer of any one of claims 1 to 8 at a temperature at least as high as the glass transition temperature of the base polymer.

* * * * *